United States Patent [19]

Schubert

[11] Patent Number: 5,403,518
[45] Date of Patent: Apr. 4, 1995

[54] FORMULATIONS FOR IMPROVED ELECTROPHORETIC DISPLAY SUSPENSIONS AND RELATED METHODS

[75] Inventor: Frederic E. Schubert, Shoreham, N.Y.

[73] Assignee: Copytele, Inc., Huntington Station, N.Y.

[21] Appl. No.: 161,315

[22] Filed: Dec. 2, 1993

[51] Int. Cl.⁶ .......................... C25D 1/12; C09K 3/00
[52] U.S. Cl. .................................. 252/572; 252/570; 204/299 R
[58] Field of Search .............................. 252/572, 570; 204/299 R

[56] References Cited

U.S. PATENT DOCUMENTS

| | | | |
|---|---|---|---|
| 3,612,758 | 10/1971 | Evans | 348/803 |
| 3,742,076 | 6/1973 | Imai et al. | 585/318 |
| 4,285,801 | 8/1981 | Chiang | 204/299 R |
| 4,298,448 | 11/1981 | Muller et al. | 204/299 R |
| 4,309,081 | 1/1982 | Camlibel et al. | 359/270 |
| 4,655,897 | 4/1987 | DiSanto et al. | 204/299 R |
| 4,680,103 | 7/1987 | Beilin Solomon et al. | 204/299 R |
| 4,732,830 | 3/1988 | DiSanto et al. | 430/20 |

OTHER PUBLICATIONS

B. Fitzhenry, Identification of a Charging Mechanism Using Infrared Spectroscopy, Applied Spectroscopy, vol. 33, No. 2, 1979.

Murau and Singer, The Understanding And Elimination Of Some Suspension Instabilies In An Electrophoretic Display, Journal of Applied Physics, vol. 49(9), 1978.

Fowkes, et al., Mechanism Of Electric Charging Of Particles In Nonaqueous Dispersons, Journal of the American Chemical Society, vol. 15, 1982.

Fowkes, et al., Steric And Electrostatic Contributions To The Colloidal Properties Of Nonaqueous Dispersons, Journal of the American Chemical Society, vol. 21, 1984.

Primary Examiner—Christine Skane
Attorney, Agent, or Firm—Arthur L. Plevy

[57] ABSTRACT

The invention provides an electrophoretic suspension comprising a suspension medium including tetrachloroethylene, 5-ethylidene-2-norbornene and an aromatic solvent including either a mixture of phenyl xylyl ethanes or a mixture of mono and di-benzyl toluene. The suspension further comprises a plurality of pigment particles dispersed in the suspension medium; a fluid dye dissolved in the suspension medium for providing a contrast with the pigment particles; and a charge control agent adsorbed on the pigment particles for preventing the pigment particles from agglomerating.

23 Claims, 1 Drawing Sheet

FORMULATIONS FOR IMPROVED ELECTROPHORETIC DISPLAY SUSPENSIONS AND RELATED METHODS

RELATED APPLICATIONS

The assignee, Copytele, Inc. is the record owner of U.S. patent application entitled "SUSPENSION FOR USE IN ELECTROPHORETIC IMAGE DISPLAY SYSTEMS", Ser. No. 08/092,749, filed on Jul. 6, 1993, for Frederic E. Schubert and assigned to Copytele, Inc.

FIELD OF THE INVENTION

This invention relates to electro-optical devices in general and, more particularly, to dielectric fluid suspension compositions for electrophoretic displays and related methods of manufacture.

BACKGROUND OF THE INVENTION

The electrophoretic effect is well known as the prior art is replete with patents and articles describing the effect. As described and discussed in the prior, the electrophoretic effect operates on the principle that certain particles, when suspended in a medium, can be electrically charged and thereby caused to migrate through the medium to an electrode of opposite charge. Electrophoretic image displays (EPIDs) implement the electrophoretic effect to produce desired images. In prior art EPIDs, colored particles, which are charged either positively or negatively, are suspended in a dielectric fluid medium that is either clear or of a color which optically contrasts with the particles. The suspension is injected into a cell comprising two parallel screen electrodes, at least one of which is transparent. The colored particles are caused to migrate to, and impinge upon, one of the screen electrodes under the application of an electric field, thereby displacing the fluid medium at that electrode creating the desired image. When the polarity of the field is reversed, the colored particles migrate to the opposite screen electrode.

For suitable example of such devices using the electrophoretic effect, reference is made to U.S. Pat. No. 4,732,830 entitled ELECTROPHORETIC DISPLAY PANELS AND ASSOCIATED METHODS and issued to Frank J. DiSanto et al. on Mar. 22, 1988. In this patent, there is disclosed an electrophoretic display apparatus which includes a planar transparent member having disposed thereon a plurality of vertically extending, electrically conductive lines defining a grid. A plurality of horizontally extending electrically conductive cathode lines are disposed on top of the vertical lines but are insulated therefrom by a thin insulating layer, thereby forming an XY matrix of electrodes. A conductive plate or anode is spaced above the line pattern and disposed therebetween in an electrophoretic dispersion of yellow pigment particles in a dark colored suspension medium. The particles are transportable within the medium.

The performance of the resulting display is strongly dependent upon the suspension stability. Colloid particles owe their suitability against instability to the fact that their surfaces are charged and, hence, repel each other. When the particles are uncharged, the dispersion is unstable. The fact that a colloidal particle bears a net surface charge is not a sufficient condition for stability because electroneutrality demands that the particle plus its immediate surrounding bear no net charge. In other words, the surface charge must be compensated by an equal but opposite counter charge, so that surface charge and countercharge together form an electrical double layer. P. Murau and B. Singer, in an article appearing in Vol. 49, No. 9 of the Journal of Applied Physics (1978) and entitled "The Understanding and Elimination of Some Suspension Instabilities in an Electrophoretic Display", indicated that when the double layer is compressed, the particles can approach each other to within a few hundred angstroms before repulsion is felt and the van der Waals attraction becomes so strong that aggregation occurs.

The interactions of particle surfaces and charge control agents in colloidal suspensions has been the subject of considerable research. Reference is made to an article entitled "Mechanism of Electric Charging of Particles in Nonaqueous Liquids" appearing in Vol. 15 of the Journal of the American Chemical Society (1982), F. M. Fowkes et al discuss the mechanism of electrostatic charging of suspended acidic particles by basic dispersants in solvents of low dielectric constant. Reference is also made to an article entitled "Steric and Electrostatic Contributions to the Colloidal Properties of Nonaqueous Dispersions" appearing in Vol. 21 of the Journal of the American Chemical Society (1984) wherein F. M. Fowkes and R. J. Pugh discuss the importance f of anchoring sites for steric stabilizers in minimizing particle flocculation. The essential point developed by these references is that particle surface interactions are acid-base in character. Acidic pigment surface sites and basic charge control agents yield negative pigment surface charge. On the other hand, basic pigment surface sites and acidic charge control agents yield positive pigment surface charge.

Since electrophoretic devices utilize low polarity liquids in which ionization of ordinary organic acids and salts is negligible the charge of the particle is governed by trace impurities unless otherwise controlled by adsorbing on the pigment surface a suitable charge control agent. This amount of charge, although sufficient for electrophoretic activity may still be inadequate for electrostatic stabilization of the suspension. If the charge control agent is also polymeric, or a polymeric dispersant is present in addition, the colloid stability can be further enhanced. See for example, an article by P. Murau and B. Singer appearing in Vol 49, No. 9 of the Journal of Applied Physics (1978) and entitled "The Understanding and Elimination of some suspension instabilities in an Electrophoretic Display". Over recent years, attention has therefore been directed to dispersion stabilization by way of adsorbed polymers on particle surfaces. If two colloidal particles coated with adsorbed layers of polymers approach each other, steric repulsion can occur as soon as the polymer layers start to penetrate. According to Murau and Singer, the polymer molecules adsorbed on a colloidal particle never lie flat on the surface. Rather, parts of the long chains (loose-ends, side branches, and loops) are free from the surface and surrounded by liquid.

As will be recognized by a person skilled in the art, the selection of the electrophoretic particles used in the EPID is very important in determining the performance of the EPID and the qualify of the viewed image produced. Ideally, electrophoretic particles should have an optimum charge/mass ratio, which is dependent upon the particle size and surface charge, in order to obtain good electrostatic deposition at high velocity as well as rapid reversal of particle motion when voltages change.

Additionally, it is desirable to utilize electrophoretic particles that have essentially the same density as the fluid medium in which they are suspended. By using electrophoretic particles through the medium remains independent of both the orientation of the EPID and the forces of gravity.

To effect the greatest optical contrast between electrophoretic particles and the suspension medium, it is desirable to have either light-colored particles suspended in a dark medium or black particles suspended in a backlighted clear medium. In the prior art, it has been proven difficult to produce black electrophoretic particles that are dielectric, of uniform size and have a density matching that of a common suspension medium. As a result, EPIDs, commonly use readily manufactured light colored electrophoretic particles suspended in dark media. Such EPIDs are exemplified in U.S. Pat. Nos: 4,655,897 to DiSanto et al., 4,093,5341 to Carter et al., 4,298,4481 to Muller et al., and 4,285,801 to Chaing.

Another parameter of display performance which is of critical importance is writing speed. Writing speed is the speed at which the colored particles, resting initially on one screen electrode move through a medium and rest on an oppositely charged screen electrode when an electric field is applied. The actual writing time or speed required to produce an image on the display is very dependent upon 1) the speed at which the colored particles separate from the screen electrode and 2) the speed at which the colored particles pack at the oppositely charged screen electrode. In the quest to increase the writing speed of the display, prior art suspension formulations have been made which exhibit extremely fast speeds of separation from the screen electrode but which exhibit slow and unusable packing speeds at the oppositely charged screen electrode.

Accordingly, it is an object of the present invention to provide an electrophoretic suspension composition and method of making, which exhibits an increased writing speed via an increased speed of colored particle separation from the screen electrode while maintaining an acceptable speed of colored particle packing at the oppositely charged screen electrode.

SUMMARY OF THE INVENTION

In accordance with the present invention, an electrophoretic suspension formulation comprising a suspension medium including tetrachloroethylene, 5-ethylidene 2-norbornene, and an aromatic solvent including either a mixture of phenyl xylyl ethanes or a mixture of mono and di-benzyl toluenes; a plurality of pigment particles dispersed in the suspension medium; a fluid dye dissolved in the suspension medium for providing a contrast with the pigment particles; and a charge control agent adsorbed on the pigment particles for preventing the pigment particles from agglomerating. The electrophoretic suspension of the present invention is manufactured by combining tetrachloroethylene with 5-ethylident 2-norbornene and either a mixture of phenyl xylylethanes or a mixture of mono and di-benzyl toluenes to form a suspension medium; adding pigment particles of a first color to said suspension medium; adding a charge control agent to prevent agglomeration of the pigment particles; dissolving a fluid dye of a second color in the suspension medium; and ball milling the suspension medium to thoroughly disperse the pigment particles therein. The specific gravity of the suspension medium is adjusted to be slightly greater than the specific gravity of the pigment particles by adding 5-ethylidene-2-norbornene. The suspension medium is centrifuged to remove unwanted particulate matter and then homogenized by ultrasound.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing wherein.

DETAILED DESCRIPTION OF THE INVENTION

Figure 1:
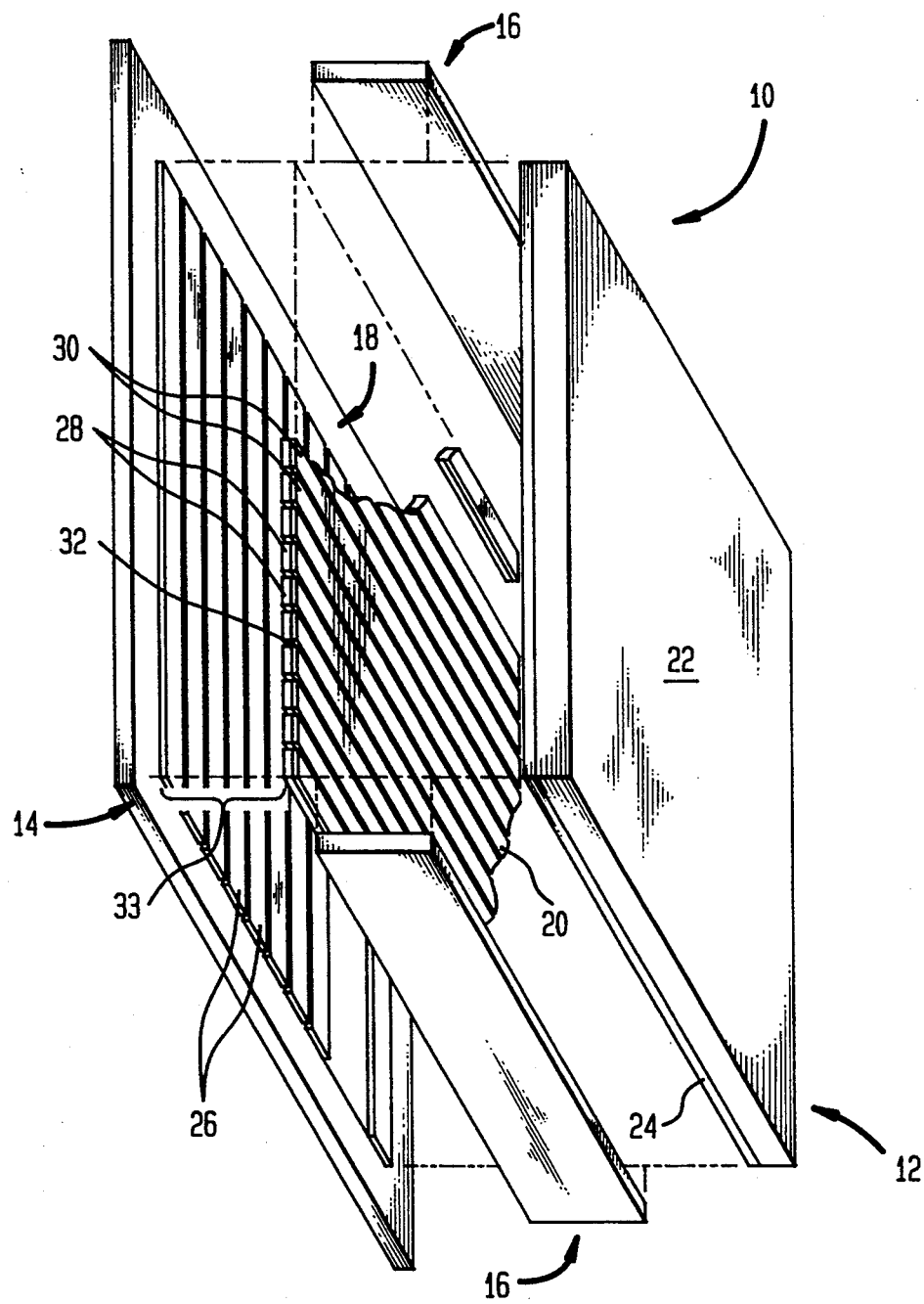
FIG. 1 is a simplified perspective view of an electrophoretic display device with portions partially cut away.

In its broadest aspects, the present invention is directed toward improving the speed, usable lifetime and usable temperature range of suspensions in electrophoretic display devices. Referring to the sole FIGURE, there is shown a simplified perspective view of an electrophoretic display device. Apart from the process of making the suspension, the display 10 can be fabricated in a manner as known in the art. The construction of such displays are well known and reference may be had to the aforementioned U.S. Pat. No. 4,732,830 to DiSanto et al., the disclosure of which is incorporated herein by reference, for details of the same. As shown in FIG. 1, a cell 10 includes a back panel 12, a front panel 14 and side panels 16 to define an enclosed space 18. The enclosed space is bounded by interior surfaces 20, with the cell exterior having exterior surfaces 22.

A layer of conductive material is deposited on an interior side of back panel 12 to serve as the anode 24. Substantially parallel strips 26 of a conductive material are deposited an interior side of front panel 14 to serve as a set of cathodes. Each strip cathode is electrically isolated from adjacent strip cathodes. On top of cathodes 26 is deposited a layer of electrically insulating material 28. On top of layer 28 are deposited substantial parallel strips 30 of conductive material to serve as the control or grid electrodes. Adjacent grid electrodes 30 are also electrically isolated from one another.

The portions of insulator 28 exposed in between the grid electrodes are etched away in a conventional manner to expose small sections of the cathodes between the columns of grid electrodes. When cell 10 is viewed through back panel 12, the grid electrodes 30 overlap cathodes 26 in square or rectangular sections. Within each such section a number of walls 32 are etched into the grid electrodes and into the insulator layer underneath to expose portions of the cathode at the bottom of the wells. Cathodes 26, insulating material 28, and control electrodes 30 form X-Y matrix structure 33.

Back panel 12 is typically composed of glass or transparent plastic. Anode 24 is comprised of an electrically conductive metal or metal oxide, such as a mixture of indium oxide and tin oxide ("ITO") and may be applied to front panel 12 by means such as vacuum sputtering. Front panel 14 is also typically comprised of glass or transparent plastic and is coated with a layer of ITO, which, based on its thickness, is transparent. The cathode strip pattern is etched on the surface of the ITO layer on front panel 14 using conventional etchants as used in the integrated circuit art. The grid electrodes 30 may be comprised of chrome or some other electrically conductive material and may be applied to the insulating material 28 by vacuum sputtering or some other technique. Front panel 14 may extend beyond back panel 12 and carry means thereon (not shown) for conducting voltages to the anodes 24, control electrodes 30, and cathodes 26.

A dielectric, or suspending, liquid 34 is disposed within the enclosed space 18. The liquid typically fills the volume between the front and back panels and side panels of the cell and wells 32. Pigment particles 36 are disposed in the suspension and function as a diffuse reflector when the particles are packed on the cathode. When a sufficient electrical bias is applied between the anode 24 and cathode 26, the electrophoretic particles 36 migrate in response thereto to either the cathode 26 or anode 24 depending on polarity and displace the dark color medium 24 at the viewing surface, thereby creating a white pixel. Reversing the voltage produces a dark pixel.

As briefly discussed earlier, the operation of an electrophoretic cell involves movement of particles, initially resting on one electrode, through space under the influence of an electric field, to rest finally on an electrode of opposite charge.

If a simple electrophoretic cell is pictured, with particles initially on one electrode, attracted there by their charge, which is opposite to the applied voltage, reversal of the sign of the applied voltage will lead to motion.

The motion of the particles from cathode to anode across the cell, upon electrode voltage sign reversal, can be viewed as taking place in four steps:

1) Separation of particles from the starting electrode.
2) Acceleration of particles to terminal velocity in the electric field.
3) Movement of particles at terminal velocity to the neighborhood of the anode.
4) Deceleration and packing of particles at the anode.

This motion becomes complicated by the fact that a wave of space charge, and not a single particle in involved. Step 1 is extremely important because the actual writing time to produce an image on the display is determined by what occurs during the first few microns of movement. This is the distance involved in moving from the cathode on the from panel 14 to beyond the grid 30, an insulator thickness away. Mixes with otherwise acceptable electrophoretic properties are not useful if apparent stickiness lengthens the time for Step 1.

Step 2 is quite brief. For particles about one micron in diameter with about 100 electron charges in a field of about one megavolt per meter, a terminal velocity of around 3 microns per millisecond is reached in about one microsecond. Given the terminal velocity, Step 3 is dependent on the thickness of the cell. Step 4 is important since settling of the pigment on the back electrodes insures complete writing of the cell. That is, the next voltage adjustment in the cell will not lead to ghosting or crosstalk if no loose pigment sits between electrodes. Complete settling involves times varying significantly with suspension composition and cell thickness. For a cell with cathode to anode distance of about 14 mils this time is typically of the order of a second. Suspensions have been made with extremely fast Step 1 times which were unusable because Step 4 was too long. Improvements in speed from the standpoint of suspension composition must address both Steps 1 and 4. Besides involving varying times for different suspensions, Step 4 does not always produce a smooth layer of pigment on the anode. Cell thickness, pigment concentration and field strength interact to determine coating layer smoothness. The pigment concentrations employed in the improved suspension were chosen after testing to optimize uniformness of electrode coating and acceptable Step 4 times for a cell with a cathode-anode spacing of about 100 microns and a field strength of about one megavolt per meter.

The suspension composition of the present invention increases the speed of Step 1 significantly while keeping the time for Step 4 at an acceptable level. Additional improvements associated with this suspension are: enhanced lifetime by absorption of reactive impurities; enhanced lifetime by reducing solvent attack on the pigment particle surface; and a broader range of temperature stability.

To improve the overall speed of operation of the electrophoretic display, attention was focused on increasing the speed of Step 1, the freeing of the pigment particles form the electrode and from their neighbors. It is well known that xylene will attack the surface of pigment particles made from Yellow 14. As such, the solvent, secondary-butyl benzene, has been utilized in the past because it is a somewhat weaker solvent, due to its alkyl chain. It is still an aromatic and is chemically similar to xylene and thus capable of aiding in wetting the pigment surface in suspension preparation. Tests showing growth of pigment particle size with suspension heating, suggest a strong pigment solvent interaction.

The present invention employs tetrachloroethylene (a high density component), in combination with two other solvents. One of the other two solvents comprises an aliphatic solvent which does not interact strongly with the pigment surface. The other of the two solvents comprises an aromatic liquid added in sufficient quantity to insure that the pigment surface is wetted. This maintains good interaction between the OLOA surfactant and pigment, while still reducing the total amount of aromatic solvent in the system. OLOA is a preferred stabilizer and charging agent and is adsorbed by the pigment particles to minimize particle agglomeration.

The aromatic liquid chosen in the present invention comprises SAS 40 from Nisseki Chemical Co. This mixture of substituted phenyl xylylethanes was developed for use in the electronics industry as a dielectric. In addition to its dielectric properties it tends to chemically absorb hydrogen formed from electrochemical reactions arising from impurities, like water. Water is both present initially in the cell and is also introduced over time by diffusion through the chamber walls. The gas absorbing character of SAS 40 extends the life of industrial electronic components and is a positive factor in electrophoretic displays.

Other aromatic liquids like Jarylec C-101 made by Prodelec Co., a mixture of mono and di-benzyl toluenes can also be used. Both SAS40 and Jarylec C-101 are characterized by a high C/H ratio produced by multiple aromatic rings. They are also liquids over a practically useful temperature range. These aromatic liquids were chosen as an aid in pigment-surfactant interaction and to help in absorption of possible hydrogen gas generated by impurities.

The preferred non-aromatic hydrocarbon in the present invention is 5-ethylidene-2-norbornene. Other choices are possible, but this material possesses a few positive characteristics. First, it is a liquid over a broad temperature range. Second, its viscosity is not high. Low viscosity is important because speed of pigment movement through the cell is inversely proportional to solvent viscosity. Thus as viscosity is lowered, speed of pigment movement increases. Third, its density is about 25% higher than that of comparable straight chain hydrocarbons. This leads to less tetrachloroethylene being needed in the suspension to match pigment density. Fourth, mixes made with this bicyclic hydrocarbon do not display as much pigment adhesion to the electrode in cell operation. This produces a quicker release from the electrode in Step 1.

A typical solvent suspension which may be utilized contains a non-polar solvent medium which has been density matched to the particles so that the particles remain randomly dispersed therein, unaffected by the orientation of the EPID or the effects of gravity. For example, in U.S. Pat. No. 4,732,830 to DiSanto et al., the solvent comprised a mixture consisting mainly of tetrachloroethylene with a small amount of an aromatic hydrocarbon added thereto. In U.S. Pat No. 4,203,106, entitled X-Y ADDRESSABLE ELECTROPHORETIC DISPLAY DEVICE WITH CONTROL ELECTRODE and issued to Dalis et al. on May 13, 1980, there is disclosed an electrophoretic suspension utilizing xylene and perchloroethylene as the dielectric fluid. In contrast, the improved suspension of the present invention still employs tetrachloroethylene, however, the single aromatic low density component of the prior art formulation is replace by a combination of an aromatic liquid and an aliphatic liquid.

Pigment motion in the suspension is not sufficient by itself to produce an image. A contrasting dye must be used to "hide" the pigment in dark areas of the image while the pigment itself produces the bright or yellow portion of the image. Solvent Blue 35 dye solution is used in the suspension of the present invention, and produces a very strong blue- black contrast to the yellow pigment.

EXAMPLE 1

Any known manner may be utilized to prepare the pigment particles of the electrophoretic suspension in which the formulation of the present invention is employed. In preparation of the suspension in accordance with this example, a yellow pigment was selected designated as AAOT yellow which is a pigment manufactured by Sun Chemical Company.

The charge control agent and stabilizing agent employed with this pigment is OLOA 1200, a product of Chevron Corporation. OLOA 1200 is a polybutene succinimide with a basic anchoring group and an extended polyisobutylene chain. The particles were prepared by ball milling all components for about eight hours. This was done to increase the surface area of the pigment powder by breaking up the dry agglomerated pigment powder into individual particles, thereby increasing the reactivity between the pigment powder and the stabilizer. During milling the temperature of the suspension rises to a little over 40 C.

The media used in the milling procedure are 2.0 mm zirconium beads having a density of 6.0 g/ml. During the milling procedure, some of the OLOA-1200 is adsorbed in to the surface of the beads, forming a coating thereon. After milling, the suspension is strained from the beads. At this point, the specific gravity of the mix is measured. If necessary, the mix is adjusted by adding 5-ethylidene-2-norborene to make sure the mix is slightly more dense than the pigment. The suspension is then divided into centrifuge tubes and spun at 5000 RPM for 30 minutes. The suspension is transferred to fresh test tubes by carefully drawing out the pigment and most of the liquid. A small amount of liquid and grey-white dense solid, which has settled out, are left behind. The primary source of the residue is the zirconium oxide. The process of transferring to fresh tubes is repeated three times to ensure adequate removal of unwanted particulate matter. In order to produce the EPID suspension, the resulting mixture was homogenized for about 8 sec using ultrasound (Model UP150, instrument of Sonicor, Inc.) and filled as the suspension into an EPID cell (test cell in accordance with FIG. 1). The suspension composition is presented in Table 1.

TABLE 1

|  | Concentration |
|---|---|
| Yellow pigment, AAOT, product of Sun Chemical Co. | 1% |
| Solvent Blue 35 (SB35) blue dye, #30,643-6, product of Aldrich Co. 1,4-Bis(butylamino)-9,10-anthracenedione | 0.32% |
| OLOA 1200 stabilizer and charging agent, product of Chevron Chemicals Co. | 0.8% |
| SAS 40 product of Nisseki Chemical Co. (mixture of phenyl xylylethanes) | 6% |
| Tetrachloroethylene and 5-ethylidene-2-norbornene background solvent adjusted to a density of 1.43 g/ml | 91.9% |

The suspension of example 1 manifested significant improvement in Step 1 speed while maintaining acceptable Step 4 speed. Thus, it was significantly faster in writing images than prior art suspensions.

EXAMPLE 2

Example 2 was prepared in the same manner as in Example 1 except that Jarylec C 101, a mixture of mono and di-benzyl toluenes was substituted for SAS 40. The suspension of example 2 displayed properties like those of Example 1, in that it provided significantly faster writing speed via increased step 1 speed than previous suspension formulations.

I claim:
1. An electrophoretic suspension comprising:
   a suspension medium comprising tetrachloroethylene, 5-ethylidene-2-norbornene and an aromatic solvent;
   a plurality of pigment particles dispersed in said suspension medium;
   a fluid dye dissolved in said suspension medium for providing a contrast with said pigment particles; and
   a charge control agent adsorbed on said pigment particles for preventing said pigment particles from agglomerating.
2. The electrophoretic suspension according to claim 1, wherein said aromatic solvent is a mixture of phenyl xylyl ethanes.
3. The electrophoretic suspension according to claim 1, wherein said aromatic solvent is a mixture of mono and di-benzyl toluenes.
4. The electrophoretic suspension according to claim 1, wherein said tetrachloroethylene and said 5-ethylidene-2-norbornene are present in said suspension at a concentration of 91.9 percent by weight.

5. The electrophoretic suspension according to claim 1, wherein said aromatic solvent is present in said suspension at a concentration of 6.0 percent by weight.

6. The electrophoretic suspension according to claim 1, wherein said charge control agent is present in said suspension at a concentration of 0.8 percent by weight.

7. The electrophoretic suspension according to claim 1, wherein said fluid dye is present in said suspension at a concentration of 0.32 percent by weight.

8. The electrophoretic suspension according to claim 1, wherein said plurality of pigment particles are present in said suspension at a concentration of 1.0 percent by weight.

9. The electrophoretic suspension according to claim 1, wherein said suspension has a specific gravity of 1.43 grams/milliliter.

10. A process for making a suspension for an electrophoretic display, comprising the steps of:
combining tetrachloroethylene with 5-ethylidene-2-norbornene and an aromatic solvent to form a suspension medium;
adding pigment particles of a first color to said suspension medium;
adding a charge control agent to said suspension medium to prevent agglomeration of said plurality of pigment particles;
dissolving a fluid dye of a second color in said suspension medium; and
ball milling said suspension medium to thoroughly disperse said pigment particles therein.

11. The process according to claim 10, wherein said ball milling is substantially eight hours in duration.

12. The process according to claim 10, further comprising the step of adjusting the specific gravity of said suspension to be slightly greater than the specific gravity of said pigment particles by adding said 5-ethylidene-2-norbornene.

13. The process according to claim 12, further comprising the step of centrifuging said suspension to remove unwanted particulate matter.

14. The process according to claim 13, wherein said centrifuging of said suspension is for 30 minutes at 5000 rpm.

15. The process according to claim 12, further comprising the step of homogenizing said suspension using ultrasound.

16. The process according to claim 15, where said step for homogenizing is approximately 8 seconds in duration.

17. The process according to claim 10, wherein said first color contrasts with said second color.

18. The process according to claim 10, wherein said tetrachloroethylene and said 5-ethylidene-2-norbornene are present in said suspension at a concentration of 91.9 percent.

19. The process according to claim 10, wherein said aromatic solvent is a mixture of phenyl xylylethanes present in said suspension at a concentration of 6.0 percent by weight.

20. The process according to claim 10, wherein said aromatic solvent is a mixture of mono and di-benzyl toluenes present in said suspension at a concentration of 6.0 percent by weight.

21. The process according to claim 10, wherein said charge control agent is present in said suspension at a concentration of 0.8 percent by weight.

22. The process according to claim 10, wherein said fluid dye is present in said suspension at a concentration of 0.32 percent by weight.

23. The process according to claim 10, wherein said pigment particles are present in said suspension at a concentration of 1.0 percent by weight.

* * * * *